(12) United States Patent
Park et al.

(10) Patent No.: US 9,189,066 B2
(45) Date of Patent: Nov. 17, 2015

(54) TOUCH PANEL AND ELECTRONIC DEVICE INCLUDING THE SAME

(75) Inventors: Tae-Sang Park, Suwon-si (KR); Seong-Taek Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 755 days.

(21) Appl. No.: 12/889,800

(22) Filed: Sep. 24, 2010

(65) Prior Publication Data

US 2011/0181530 A1 Jul. 28, 2011

(30) Foreign Application Priority Data

Jan. 28, 2010 (KR) .................. 10-2010-0008105

(51) Int. Cl.
*G06F 3/041* (2006.01)
*G06F 3/01* (2006.01)
(52) U.S. Cl.
CPC ...................................... *G06F 3/016* (2013.01)
(58) Field of Classification Search
CPC ........................................................ G06F 3/016
USPC .................................................. 345/173–174
See application file for complete search history.

(56) References Cited

U.S. PATENT DOCUMENTS

| | | | |
|---|---|---|---|
| 4,923,057 A | 5/1990 | Carlson et al. | |
| 4,963,417 A | 10/1990 | Taniguchi et al. | |
| 5,055,840 A | 10/1991 | Bartlett | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,556,177 B1 | 4/2003 | Katayama et al. | |

(Continued)

FOREIGN PATENT DOCUMENTS

| | | |
|---|---|---|
| CN | 1675969 A | 9/2005 |
| CN | 1678978 A | 10/2005 |

(Continued)

OTHER PUBLICATIONS

Extended European search report dated Oct. 7, 2010 issued by the European Patent Office in counterpart European Application No. 10166013.2 of co-pending U.S. Appl. No. 12/780,996.

(Continued)

*Primary Examiner* — Temesgh Ghebretinsae
*Assistant Examiner* — Kwin Xie
(74) *Attorney, Agent, or Firm* — Sughrue Mion, PLLC

(57) ABSTRACT

A touch panel and an electronic device having the same are provided. The touch panel includes a first substrate; a second substrate that is spaced apart from the first substrate by a gap, the second substrate including a touch surface; an array of driving electrode pairs that is arranged on the first substrate and the second substrate, and induces an electrical field locally between the first substrate and the second substrate when a driving voltage is applied thereto; and electro-rheological fluid that is filled in the gap between the first substrate and the second substrate, a viscosity of the electro-rheological fluid changing depending on the electrical field induced by the driving electrode pairs. An operating force or a return force is adjusted by controlling an application or release of the driving voltage.

22 Claims, 16 Drawing Sheets

(56) References Cited

U.S. PATENT DOCUMENTS

| | | |
|---|---|---|
| 6,809,462 B2 | 10/2004 | Pelrine et al. |
| 7,051,292 B2 | 5/2006 | Nagase |
| 7,067,756 B2 | 6/2006 | Cok |
| 7,131,073 B2 | 10/2006 | Rosenberg et al. |
| 7,196,688 B2 | 3/2007 | Schena |
| 7,202,837 B2 | 4/2007 | Ihara |
| 7,268,770 B1 | 9/2007 | Takahata et al. |
| 7,339,572 B2 | 3/2008 | Schena |
| 7,342,573 B2 | 3/2008 | Ryynaenen et al. |
| 7,369,122 B2 * | 5/2008 | Cross et al. .......... 345/173 |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 | 1/2013 | Heubel et al. |
| 8,493,131 B2 | 7/2013 | Mo et al. |
| 8,581,866 B2 | 11/2013 | Park et al. |
| 8,749,498 B2 | 6/2014 | Lim et al. |
| 2001/0026636 A1 | 10/2001 | Mainguet et al. |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 | 1/2003 | Andrade |
| 2004/0090426 A1 | 5/2004 | Bourdelais et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 * | 12/2005 | Funaki .......... 345/173 |
| 2006/0097991 A1 | 5/2006 | Hotelling et al. |
| 2006/0099808 A1 | 5/2006 | Kondo |
| 2006/0103634 A1 | 5/2006 | Kim et al. |
| 2006/0119589 A1 | 6/2006 | Rosenberg et al. |
| 2007/0080951 A1 | 4/2007 | Maruyama et al. |
| 2007/0152974 A1 | 7/2007 | Kim et al. |
| 2007/0152982 A1 | 7/2007 | Kim et al. |
| 2007/0182718 A1 * | 8/2007 | Schoener et al. .......... 345/173 |
| 2007/0211032 A1 | 9/2007 | Ahn et al. |
| 2007/0229464 A1 | 10/2007 | Hotelling et al. |
| 2008/0007815 A1 * | 1/2008 | Liang et al. .......... 359/296 |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1 | 11/2008 | Kwon et al. |
| 2009/0002199 A1 | 1/2009 | Lainonen et al. |
| 2009/0002328 A1 | 1/2009 | Ullrich et al. |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0250267 A1 * | 10/2009 | Heubel et al. .......... 178/18.03 |
| 2009/0308737 A1 | 12/2009 | Kudoh |
| 2010/0024573 A1 * | 2/2010 | Daverman et al. ....... 73/862.626 |
| 2010/0026654 A1 | 2/2010 | Suddreth |
| 2010/0026655 A1 | 2/2010 | Harley |
| 2010/0059295 A1 | 3/2010 | Hotelling et al. |
| 2010/0060610 A1 | 3/2010 | Wu |
| 2010/0141407 A1 | 6/2010 | Heubel et al. |
| 2010/0149108 A1 | 6/2010 | Hotelling et al. |
| 2010/0156829 A1 * | 6/2010 | Shimodaira .......... 345/173 |
| 2010/0177050 A1 | 7/2010 | Heubel et al. |
| 2010/0214232 A1 | 8/2010 | Chan et al. |
| 2010/0244858 A1 | 9/2010 | Cormier, Jr. |
| 2010/0259485 A1 | 10/2010 | Chuang |
| 2010/0321330 A1 | 12/2010 | Lim et al. |
| 2010/0321335 A1 | 12/2010 | Lim et al. |
| 2011/0012851 A1 | 1/2011 | Ciesla et al. |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227862 A1 | 9/2011 | Lim |
| 2011/0279374 A1 | 11/2011 | Park et al. |
| 2012/0019467 A1 | 1/2012 | Hotelling et al. |
| 2012/0038563 A1 | 2/2012 | Park et al. |
| 2012/0062516 A1 | 3/2012 | Chen et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| CN | 1829951 A | 9/2006 |
| CN | 101046720 A | 10/2007 |
| CN | 101510008 A | 8/2009 |
| CN | 101840296 A | 9/2010 |
| EP | 1 544 720 A1 | 6/2005 |
| EP | 2 026 178 A1 | 2/2009 |
| EP | 2 141 569 A2 | 1/2010 |
| EP | 2 079 052 B1 | 3/2011 |
| JP | 6-34940 A | 2/1994 |
| JP | 6-85642 A | 3/1994 |
| JP | 7-302903 A | 11/1995 |
| JP | 09-319509 A | 12/1997 |
| JP | 11-203025 A | 7/1999 |
| JP | 11-273501 A | 10/1999 |
| JP | 2000-066782 A | 3/2000 |
| JP | 2000-356973 A | 12/2000 |
| JP | 2001-282433 A | 10/2001 |
| JP | 2002-157087 A | 5/2002 |
| JP | 2002-236550 A | 8/2002 |
| JP | 2002-342035 A | 11/2002 |
| JP | 2004-71765 A | 3/2004 |
| JP | 2004-362428 A | 12/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2009-187579 A | 8/2009 |
| JP | 2010-016969 A | 1/2010 |
| JP | 2010-79882 A | 4/2010 |
| JP | 2010-108505 A | 5/2010 |
| JP | 2010-532043 A | 9/2010 |
| JP | 2011-3177 A | 1/2011 |
| JP | 2011-3188 A | 1/2011 |
| JP | 2012-500089 A | 1/2012 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0121548 | 11/2009 |

(56) References Cited

FOREIGN PATENT DOCUMENTS

| KR | 10-2009-0126760 A | 12/2009 |
|---|---|---|
| KR | 10-2010-0011368 A | 2/2010 |
| KR | 10-2010-0020065 A | 2/2010 |
| KR | 10-2010-0136759 A | 12/2010 |
| WO | 02/089038 A2 | 11/2002 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005010735 A1 | 2/2005 |
| WO | 2005/091257 A1 | 9/2005 |
| WO | 2008/037275 A1 | 4/2008 |
| WO | 2009/002605 A1 | 12/2008 |
| WO | 2010105705 A1 | 9/2010 |
| WO | 2010139171 A1 | 12/2010 |

OTHER PUBLICATIONS

Final Office Action dated Nov. 22, 2013 issued by the United States Patent and Trademark Office in counterpart U.S. Appl. No. 12/849,310.
Final Office Action dated Dec. 5, 2013 issued by the United States Patent and Trademark Office in counterpart U.S. Appl. No. 13/050,550.
Non-Final Office Action dated Dec. 6, 2013 issued by the United States Patent and Trademark Office in counterpart U.S. Appl. No. 13/190,120.
Non-Final Office Action dated Jun. 20, 2013 issued by the United States Patent and Trademark Office in counterpart U.S. Appl. No. 12/780,996.
Non-Final Office Action dated Jul. 17, 2013 issued by the United States Patent and Trademark Office in counterpart U.S. Appl. No. 13/097,937.
Non-Final Office Action dated Jul. 8, 2013 issued by the United States Patent and Trademark Office in counterpart U.S. Appl. No. 12/849,310.
Non-Final Office Action dated Aug. 12, 2013 issued by the United States Patent and Trademark Office in counterpart U.S. Appl. No. 13/224,422.
Notice of Allowance dated Oct. 25, 2013 issued by the United States Patent and Trademark Office in counterpart U.S. Appl. No. 12/780,996.
Notice of Allowance dated Sep. 19, 2013 issued by the United States Patent and Trademark Office in counterpart U.S. Appl. No. 12/719,281.
Communication dated Oct. 10, 2013 issued by the State Intellectual Property Office of P.R. China in counterpart Application No. 201010200349.1.
US Advisory Action, dated Apr. 26, 2013, issued in U.S. Appl. No. 12/849,310.
Final US Office Action, dated Dec. 20, 2012, issued in U.S. Appl. No. 12/849,310.
Non-Final US Office Action, dated Aug. 28, 2012, issued in U.S. Appl. No. 12/849,310.
Final US Office Action, dated Mar. 27, 2013, issued in U.S. Appl. No. 12/948,479.
Non-Final US Office Action, dated Oct. 15, 2012, issued in U.S. Appl. No. 12/948,479.
Non-Final US Office Action, dated Feb. 1, 2013, issued in U.S. Appl. No. 13/103,221.
Non-Final US Office Action, dated Apr. 22, 2013, issued in U.S. Appl. No. 13/050,550.
Non-Final US Election Requirement, dated Apr. 10, 2013, issued in U.S. Appl. No. 13/097,937.
European Communication, dated Mar. 19, 2013, issued in European Application No. 11150285.2.
Non-Final US Office Action, dated May 7, 2013, issued in U.S. Appl. No. 12/719,281.
Notice of Allowance, dated Jan. 22, 2014, issued by the USPTO in related U.S. Appl. No. 12/780,996.
Non-Final Office Action, dated Feb. 10, 2014, issued by the USPTO in related U.S. Appl. No. 12/719,281.
Communication, dated Mar. 4, 2014, issued by the Japanese Patent Office in counterpart Japanese Patent Application No. 2010-133879.
Notice of Allowance, dated Mar. 28, 2014, issued in related U.S. Appl. No. 12/849,310.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.
Communication from the State Intellectual Property Office of P.R. China dated Mar. 19, 2015 in a counterpart application No. 201010587755.8.
Communication issued Sep. 30, 2014, by the Japanese Patent Office in related Application No. 2010-265704.
Communication issued Oct. 8, 2014, by the State Intellectual Property Office of P.R. China in related Application No. 201010609836.3.
Communication issued Oct. 16, 2014, by the European Patent Office in related Application No. 11186005.2.
Communication issued Oct. 29, 2014, by the State Intellectual Property Office of P.R. China in related Application No. 201010280797.7.
Communication issued on Aug. 11, 2015 by the Japanese Patent Office in related Application No. 2011-233676.
Office Action issued Sep. 17, 2015 by the Korean Intellectual Property Office in counterpart Korean Application No. 10-2010-0008105.

\* cited by examiner

⇒ DIRECTION OF FLOW
⇒ FLOW IMPEDANCE

⇒ DIRECTION OF FLOW
⇒ FLOW IMPEDANCE

TOUCH PANEL AND ELECTRONIC DEVICE INCLUDING THE SAME

CROSS-REFERENCE TO RELATED APPLICATION

This application claims priority from Korean Patent Application No. 10-2010-0008105, filed on Jan. 28, 2010, the disclosure of which is herein incorporated by reference in its entirety for all purposes.

BACKGROUND

1. Field

Apparatus and devices consistent with the following description relate to a user input device, and more particularly, to a touch panel used in a user input device and an electronic device including the same.

2. Description of the Related Art

A touch panel is one example of a kind of user input device used to determine whether a user generates an input and the position of the user's input by sensing the user's contact thereon. A user may input data or signals to a touch panel by contacting or pressing a surface of the touch panel with his or her finger, a stylus pen or the like. The touch panel may be used to manufacture a touch pad for use as a substitute for a mouse in a laptop computer, a netbook and the like or used for an input switch of an electronic device. The touch panel may be used in association with a display. A touch panel which is mounted on the screen of a display device, such a liquid crystal display (LCD), a plasma display panel (PDP), a cathode ray tube (CRT) and the like, is generally called a "touch screen". A touch screen may be integrated with a display device to configure the screen of the display device or may be attached additionally on the screen of the display device.

In certain situations, the touch panel may be substituted for a user input device such as a keyboard, a trackball or mouse, and also may allow for simple manipulations. Moreover, the touch panel can provide users with various types of buttons according to the types of applications to be executed or stages of the executed application. Accordingly, a touch panel, and more specifically, a touch screen has been used as an input device for electronic equipment, such as a mobile phone, a personal digital assistant (PDA), a portable media player (PMP), a digital camera, a portable games, a Moving Picture Experts Group Layer 3 (MP3) player, etc., as well as an automated tell machine (ATM), an information trader, a ticket vending machine, etc.

A touch panel can be classified into a resistive type, a capacitive type, a saw type, an infrared type, etc., according to methods of sensing user's inputs. A capacitive type touch panel determines whether a user generates an input and the position of the user's input signal by measuring variations in capacitance due to contact or pressure. However, the various types of touch panels fail to provide users a sense of input, that is, a feeling of recognition that a user gets upon inputting. In order to overcome this disadvantage, a method of installing a vibration motor below a touch panel has been proposed. The method offers users a sense of input by vibrating the whole touch panel using the vibration motor when a user's contact is sensed.

SUMMARY

One or more embodiments relate to a touch panel capable of making a user have various senses of input or clicking sensations through his or her tactile sense, and an electronic device including the touch panel.

One or more embodiments also relate to a touch panel capable of offering a user various senses of input or clicking sensations according to the types of applications to be executed or stages of the executed application, and an electronic device including the touch panel.

According to an aspect of an embodiment, there is provided a touch panel including a first substrate, a second substrate, an array of driving electrode pairs and electro-rheological fluid. The second substrate is spaced apart from the first substrate by a gap, the second substrate comprising a touch surface. The driving electrode pairs are arranged on the first substrate and the second substrate, and induce an electrical field partly between the first substrate and the second substrate when a driving voltage is applied. The electro-rheological fluid fills the gap between the first substrate and the second substrate, a viscosity of the electro-rheological fluid changing depending on the electrical field induced by the driving electrode pairs. At least one of an operating force and a return force is adjusted by controlling an application or a release of the driving voltage.

According to an aspect of another embodiment, there is provided a touch panel including a touch panel body comprising a first substrate and a second substrate, electro-rheological fluid filled in a gap between the first substrate and the second substrate, and an array of driving electrode pairs arranged on the first substrate and the second substrate to induce an electrical field locally in the gap between the first substrate and the second substrate when a driving voltage is applied; and a controller which adjusts a number of driving electrode pairs to which the driving voltage is applied among the array of the driving electrode pairs, or a location of driving electrode pairs to which the driving voltage is applied among the array of the driving electrode pairs, or both, in order to vary an operating force of the touch panel body.

According to an aspect of another embodiment, there is provided a touch panel including a touch panel body including a first substrate and a second substrate, electro-rheological fluid filled in a gap between the first substrate and the second substrate, and an array of driving electrode pairs arranged on the first substrate and the second substrate to induce an electrical field locally in the gap between the first substrate and the second substrate when a driving voltage is applied; and a sensing unit which determines whether an input to a touch surface of the first substrate occurs by measuring a change in a gap thickness between the first substrate and the second substrate, wherein the change in the gap thickness that is used to determine when an input has occurred, is adjustable.

BRIEF DESCRIPTION OF THE DRAWINGS

The above and/or other aspects will be more apparent from the following detailed description of embodiments taken with reference to the accompanying drawings, in which.

DETAILED DESCRIPTION

Figure 1:
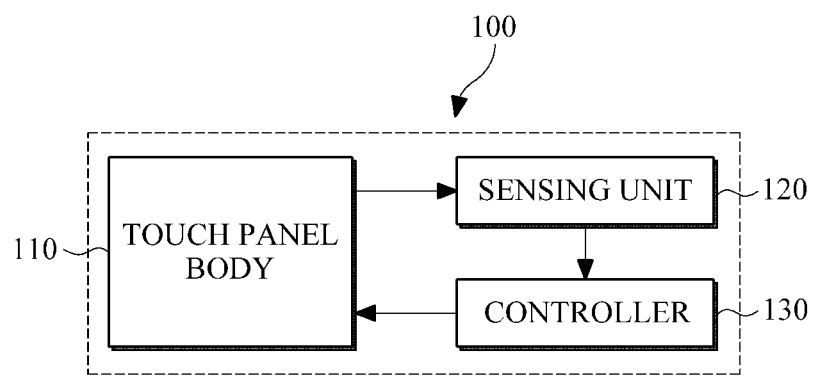
FIG. 1 is a diagram illustrating an example of a touch panel according to an embodiment.

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. These various changes, modifications, and equivalents are intended to be included in the scope of the appended claims. Also, descriptions of well-known functions and constructions are omitted to increase clarity and conciseness.

Throughout the drawings and the detailed description, unless otherwise described, the same drawing reference numerals will be understood to refer to the same elements, features, and structures. The relative sizes and depiction of these elements may be exaggerated for clarity, illustration, and convenience.

A touch panel according to embodiments that will be described below is a kind of user input device and may be mounted onto various devices. For example, the touch panel can be used as a touch pad for a notebook, a netbook or the like and also used as a user input device in various kinds of home appliances or office electronic equipment, etc. Also, the touch panel can be used as a touch screen for a display of an electronic device, for example, as a user input device of an electronic device, such as a mobile phone, a Personal Digital Assistant (PDA), a Portable Multimedia Player (PMP), an E-book terminal, a portable computer, an Automated Teller Machine (ATM), an information trader, a ticket vending machine, etc.

And, the touch panel may provide a user with various senses of input or clicking sensations. The senses of input or clicking sensations may vary according to the user's selection and/or according to the types of applications to be executed or stages of the executed application. For example, by sensing variations in reaction force against the touch panel at a contact area corresponding to a user's input location, the user may have different senses of input or clicking sensations. In order to make such differences in reaction force, in an embodiment, a touch panel is used in which an electro-rheological fluid is filled in a gap between upper and lower substrates, and a method of adjusting touch panel areas to which a driving voltage is applied or varying displacement of the touch panel at which the driving voltage is removed is used, which will be described later.

FIG. 1 is a diagram illustrating an example of a touch panel 100.

Referring to FIG. 1, the touch panel 100 includes a touch panel body 110, a sensing unit 120 and a controller 130. The touch panel body 110 is a physical structure included in the touch panel 100. The sensing unit 120 and the controller 130 may be electrical circuits and/or a combination of hardware and software, or only software which sense any input to the touch panel body 110 to control driving of the touch panel body 110. Accordingly, the term "touch panel" used in this description may indicate only the touch panel body 110 in a narrow sense, but also may indicate the entire touch panel 100 including all of the touch panel body 110, the sensing unit 120 and the controller 130 in a broad sense.

In FIG. 1, the sensing unit 120 and controller 130 are shown to be divided for logical classification according to their functions, however they may be integrated into a single unit or implemented as separate devices. The logical function classification between the sensing unit 120 and controller 130 is for convenience of description. In other words, a single integrated component may perform all functions of the sensing unit 120 and controller 130, or some functions of one (for example, the sensing unit 120) of the sensing unit 120 and controller 130 may be performed by the other one (for example, the controller 130). Hereinafter, a configuration of the touch panel body 110 will be described in detail with reference to FIGS. 2 and 3.

Figure 2:
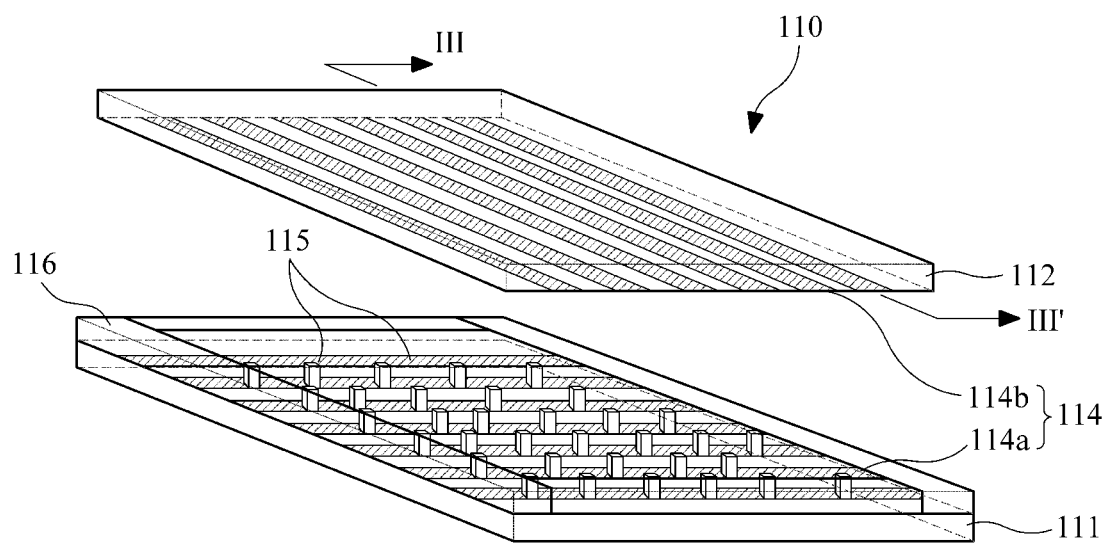
FIG. 2 is an exploded perspective view illustrating a touch panel body of the touch panel of FIG. 1.
Figure 3:
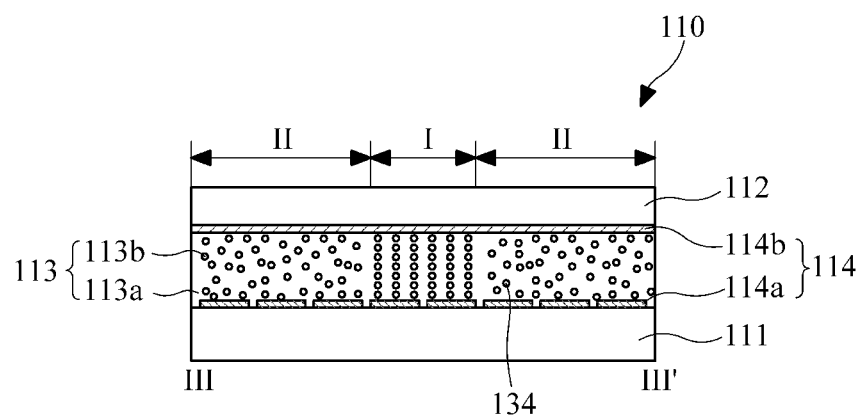
FIG. 3 is a cross-sectional view of the touch panel body taken along a line III-III' of FIG. 1.

FIG. 2 is an exploded perspective view illustrating the touch panel body 110 of the touch panel 100 of FIG. 1, and FIG. 3 is a cross-sectional view of the touch panel body 110 taken along a line III-III' of FIG. 1. Referring to FIGS. 2 and 3, the touch panel body 110 includes a pair of substrates (that is, a lower substrate 111 and a upper substrate 112), electro-rheological fluid 113 that is filled and sealed in the gap between the lower substrate 111 and the upper substrate 112, and an array of driving electrode pairs 114 that are arranged in a matrix form.

The lower substrate 111, which is a base substrate of the touch panel body 110, acts as one side of a container for filling the electro-rheological fluid 113 in the touch panel body 110. When the corresponding touch panel 100 (see FIG. 1) is implemented as a touch screen of an electronic device, the lower substrate 111 may be a display plane of the electronic device or a substrate attached additionally onto the display plane. The lower substrate 111 may be configured so as not to be deformed when a certain attraction force or repulsive force is applied between the lower substrate 111 and the upper substrate 112. That is, the lower substrate 111 may be made of a rigid or hard material. For example, the lower substrate 111 may be made of transparent glass. However, there are situations in which it is advantageous for the lower substrate 111 to be made of a material that is not a hard material. For example, if the touch panel body 110 is attached on a hard display, the lower substrate 111 may be made of a transparent polymer film.

The upper surface of the upper substrate 112 is a user touch surface which a user contacts to input a signal. The upper substrate 112 may be deformed when a predetermined force is applied thereto. For example, the upper substrate 112 may be deformed when a user contacts or presses the user touch surface S with a finger, a stylus pen, etc. For such deformation, the upper substrate 112 may be made of a transparent, deformable polymer film or the like. The type of polymer usable for the upper substrate 112 is not limited. The upper substrate 112 is spaced a predetermined distance apart from the lower substrate 111 and accordingly a gap having a predetermined thickness is formed between the upper and lower substrates 112 and 111. The thickness of the gap may be set appropriately in consideration of a driving voltage, the width of the touch panel body 110, a cross-sectional area of each driving electrode pair 114 and so on.

The electro-rheological fluid 113 is disposed in the gap between the lower and upper substrates 111 and 112. The electro-rheological fluid 113 may be sealed with sealant 116 applied along facing edge portions of one or both of the lower and upper substrates 111 and 112. The electro-rheological fluid 113 is a suspension in which fine particles 113b are dispersed in electro-insulative fluid 113a. The viscosity of the electro-rheological fluid 113 can change by a factor of 100,000 as a maximum when an electric field is applied thereto, and since such variation in viscosity is reversible, the viscosity returns to its original level when the electronic field disappears.

The electro-rheological fluid 113 may be a transparent liquid such as, for example, silicon oil, kerosene mineral oil, olefin (PCBs), or the like. However, the electro-rheological fluid 113 may be any other material that possesses similar properties of low viscosity change with changing temperature, high flash point, low freezing point, etc. and for which the viscosity changes as a function of the electric field applied thereto. The particles 113b included in the electro-rheological fluid 113 may be very fine, transparent particles having a size of maximally about 50 μm. The particles 113b may be polymers, such as aluminosilicate, polyaniline, polypyrrole, or fullerene, or any other kind of insulative materials, such as ceramics or the link. Non-transparent ERF may also be used in some applications.

Also, spacers 115 may be provided in a dispersed manner in the gap between the upper and lower substrates 112 and 111. The spacers 115 are elastic elements made of small, transparent particles whose size is less than about several tens of micrometers and are randomly distributed in the electro-rheological fluid 113. The spacers 115 shown in FIG. 2 are exaggerated in size, and the arrangement of the elastic spacers 115 shown as if they are dispersed at regular intervals is also exemplary for convenience of description, and in reality the spacers 115 are more likely to be randomly dispersed. Materials used to form the elastic spacers 115 are not limited, and for example, the spacers 115 may be made of elastomer. The spacers 115 are used to provide the upper substrate 112 with a restoring force and support the upper substrate 112 structurally. That is, the spacers operate as elastic elements between the upper and lower substrate, and allow the substrates to recover to the original film shape in a very short time after a click operation, which will be described later. The spacers are advantageously spaced throughout the touch panel, but other types of distribution patterns may be used as long as the spacers may provide the restoring force and structural support. As discussed above, the distribution may also be random. For example, at the edges of the touch panel, the film tension is stronger than that of the center portion. Thus, it may be possible to user fewer spacers in the edge regions. That is, the spacer distribution may also vary depending on the location within the touch panel.

Each driving electrode pair is a pair of driving electrodes that are respectively arranged on the lower and upper substrates 111 and 112. The driving electrode pairs 114 may be arranged in a matrix form over the entire or surface of the touch panel body 110 or on a part of the touch panel body 110. A driving voltage may be applied to a predetermined combination of the driving electrode pairs 114, for example, to a predetermined part of driving electrode pairs 114. The touch panel 100 may offer a user various senses of input or clicking sensations by changing the number of driving electrode pairs (areas) to which a driving voltage is applied, a degree of displacement of the upper substrate 112 at which the applied driving voltage is removed, the number of driving electrode pairs from which the driving voltage is removed, etc., which will be described later.

The array of driving electrode pairs 114 illustrated in FIG. 2 is an example where a plurality of driving electrodes are arranged in pairs in a matrix form. Referring to FIG. 2, a plurality of line-type electrode patterns are formed in parallel on the upper surface of the lower substrate 111 and on the lower surface of the upper substrate 112, respectively. The electrode patterns (hereinafter, referred to as lower electrode patterns 114a) formed on the lower substrate 110 extend in a first direction and the electrode patterns (hereinafter, referred to as upper electrode patterns 114b) formed on the upper substrate 112 extend in a second direction perpendicular to the first direction. Accordingly, at intersections of the lower electrode patterns 114a and upper electrode patterns 114b, the driving electrode pairs 114 arranged in a matrix form are defined over the entire area of the touch panel body 110.

Unlike the example illustrated in FIG. 2, the lower and upper electrodes constructing the driving electrode pairs 114 may be arranged in a dotted form, respectively, on the lower and upper substrates 111 and 112. Here, the upper and lower electrodes facing each other may be disposed in a matrix form on the entire area of the upper and lower substrates 111 and 112 or on a part of the upper and lower substrates 111 and 112. Each of the upper and lower electrodes may be a polygonal (for example, square) or circular electrode pattern. The dotted-type driving electrode pairs may individually connect to switchable active devices so as to be switched on/off individually using the switchable active device. That is, FIG. 2 shows line-type electrode patterns. However, it is also possible to provide an N×N array of electrodes on both the top and bottom, such that each individual pair of electrodes (top and bottom) is separately addressable and controllable.

A driving voltage that is to be applied to the driving electrode pairs 114 provides a operating force to locally vary viscosity of the electro-rheological fluid 113. The driving voltage may be supplied from a power supply of an electronic device with the touch panel 110. The number of driving electrode pairs to which the driving voltage is applied, a degree of displacement of the upper substrate 112 at which the applied driving voltage is removed, the number of driving electrode pairs from which the applied driving voltage is removed, etc. may be controlled by the sensing unit 120 and/or the controller 130.

FIG. 3 illustrates an example where a driving voltage is applied to driving electrode pairs corresponding to an area I and no driving voltage is applied to driving electrode pairs corresponding to areas II. The example may be implemented by grounding the upper electrode patterns 114b and applying a voltage Vd to a part of the lower electrode patterns 114a corresponding to the area I while maintaining the other of the lower electrode patterns 114a corresponding to the areas II in a floating state. However, it is also possible to apply the voltage Vd to the areas II while maintaining the area I in a floating state.

As illustrated in an area I of FIG. 3, when a driving voltage is applied to driving electrode pairs, or in more detail, when a certain driving voltage is applied to one side of certain ones of the driving electrode pairs and the other side of the driving electrode pairs are grounded, an electrical field is generated locally in the gap between the upper and lower substrates 112 and 111 where the driving electrode pairs are positioned. As a result, in the area I, the viscosity of electro-rheological fluid 113 is increased. This is because particles 134 having polarization characteristics are aligned, as shown in area I of FIG. 3. However, if no driving voltage is applied to the driving electrode pairs, no electrical field is generated in the gap between the upper and lower substrates 112 and 111 where the driving electrode pairs are positioned and accordingly there is no variation in viscosity of the electro-rheological fluid 113 in the corresponding areas, as shown in areas II of FIG. 3.

An example of such a touch panel using changes in viscosity of electro-rheological fluid is disclosed in detail in a Korean Patent Application No. 2009-0055034, entitled "Touch Panel and Electronic Device Including the Same", filed on Jun. 19, 2009, by the applicant of the current application. Korean Patent Application No. 2009-0055034 corresponds to U.S. application Ser. No. 12/780,996, the entire disclosure of which is incorporated by reference herein in its entirety for all purposes. Korean Patent Application No. 2009-0055034 describes a touch panel in which a predetermined input button area on a user touch surface is defined using changes in viscosity of electro-rheological fluid therebelow and offers a user a clicking sensation like pressing a mechanical key pad.

The clicking sensation replicates the sensation felt by a finger when pressing a mechanical key pad or a key button of a mobile phone or the like. In a mechanical key pad, a metal thin plate having a dome shape, which is called a metal dome or a popple, is installed below a key button. When the metal dome is pressed with a force exceeding a predetermined threshold, the metal dome is deformed sharply at a certain time, which is referred to as a buckling point. Due to such a buckling point, the user feels a clicking sensation upon pressing a mechanical key pad.

Figure 4:
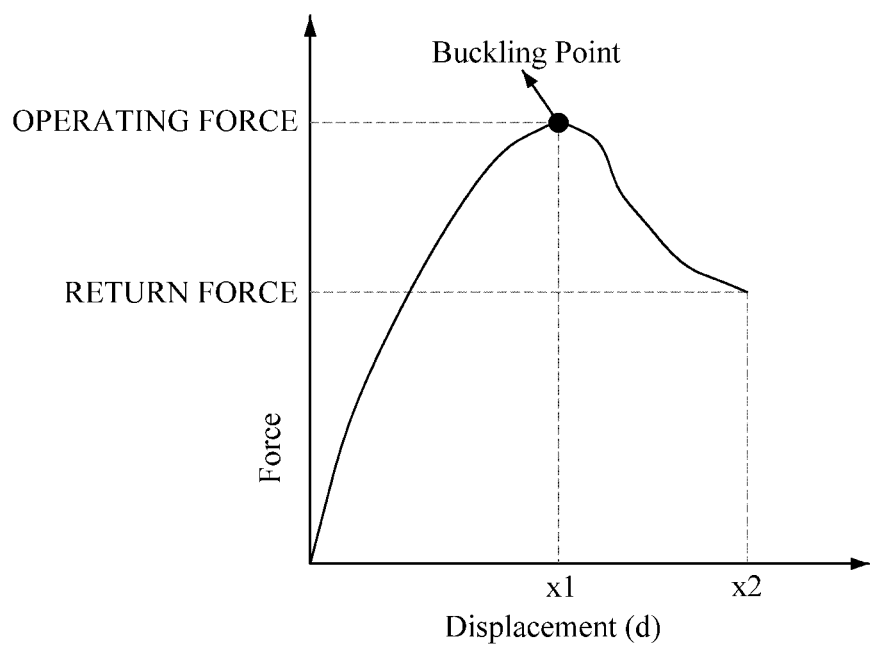
FIG. 4 is a graph showing a relationship of force to displacement in a mechanical key pad with a metal dome structure.

FIG. 4 is a graph showing a relationship of force to displacement in a mechanical key pad with a metal dome or a popple. Referring to FIG. 4, initially, the displacement of the metal dome increases gradually as a pressing force increases. Along with the increase of the metal dome's displacement, the supporting force (a resistive force against deformation) of the metal dome increases and accordingly a repulsive force also increases. When the displacement of the metal dome reaches x1, the supporting force (a resistive force against deformation) of the metal dome reaches a maximum (an operating force) and then sharply decreases. This point corresponds to a buckling point at which the supporting force of the metal dome is at a maximum (that is, at which an operating force is applied onto the touch panel). If the pressing force is maintained after the bucking point, the displacement of the metal dome continues to increase, and when the displacement of the metal dome reaches x2, the metal dome contacts the lower electrodes. Thereafter, when the pressing force disappears, the metal dome returns to its original state by a return force.

The touch panel 100 allows users to experience a clicking sensation by imitating a mechanism of a mechanical key pad. As described above with reference to FIG. 3, in the area I of the touch panel 100 where the driving electrode pairs to which the driving voltage is applied are positioned, the viscosity of the electro-rheological fluid 113 sharply increases. When the viscosity of the electro-rheological fluid 113 is high, the area I above the electro-rheological fluid 113 offers a higher repulsive force against a pressing force than the other areas (that is, the areas II). As the pressing force increases and/or as displacement of the upper substrate 112 due to the pressing force increases, the repulsive force increases accordingly. When the pressing force exceeds a threshold and/or when the displacement of the upper substrate 112 reaches a threshold level, the driving voltage being applied is removed. If the driving voltage is no longer applied, the viscosity of the electro-rheological fluid 113 sharply decreases and accordingly a repulsive force against the pressing force is also sharply reduced. In this way, a clicking sensation similar to that at the buckling point of the mechanical key pad can be provided on the touch panel 100, when the driving voltage is removed.

The clicking sensation provided by the mechanical key pad (or by the touch panel imitating a mechanical key pad) depends on an operating force and a return force (or a click rate). The operating force is a supporting force of the metal dome or a resistive force (a maximum repulsive force) against the metal dome when a pressing force reaches the buckling point. The return force is a restoring force by which the metal dome that is deformed after the buckling point returns to its original state. The clicking rate (CR) can be defined as a function of an operating force and a return force, which is written as Equation 1 below. As seen in Equation 1, CR is a value resulting from dividing a difference between an operating force and a return force by the operating force. As expected from Equation 1, the touch panel 100 imitating the operation of a mechanical key pad may offer various clicking sensations by appropriately controlling the operating force and/or the return force.

$$\text{Clicking Rate } (CR) = \frac{\text{Operating Force} - \text{Return Force}}{\text{Operating Force}} \quad (1)$$

An example of a method of changing the operating force in the touch panel 100 is to change the number of driving electrode pairs to which a driving voltage is applied. The more driving electrodes the driving voltage is applied to, the greater the operating force of the touch panel becomes. In contrast, the fewer driving electrodes the driving voltage is applied to, the smaller the operating force of the touch panel becomes. For example, when a driving electrode pair group is composed of a plurality of driving electrode pairs and defines an input button area, an operating force of the input button area is proportional to the number of driving electrode pairs to which a driving voltage is applied among the driving electrode pair group. The driving electrode pair group may include driving electrode pairs adjacent to the input button area.

There is a phenomenon where when a driving voltage is applied to predetermined driving electrode pairs, the viscosity of electro-rheological fluid 113 filled in the gap between the driving electrode pairs increases. This is because electro-rheological fluid with high viscosity offers a greater repulsive force against a pressing force applied to the electro-rheological fluid. As the repulsive force may increase in proportion to the area of electro-rheological fluid 113 with high viscosity, the operating force of the touch panel 100 may also increase with an increase in area of driving electrode pairs to which the driving voltage is applied.

Figure 5A:
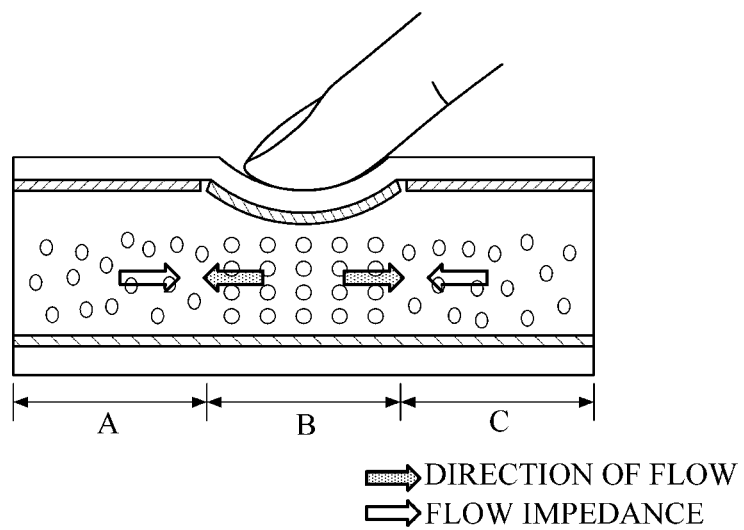
FIGS. 5A and 5B are views for comparatively explaining a phenomenon where flow impedance increases when the flow of electro-rheological fluid is restricted.
Figure 5B:
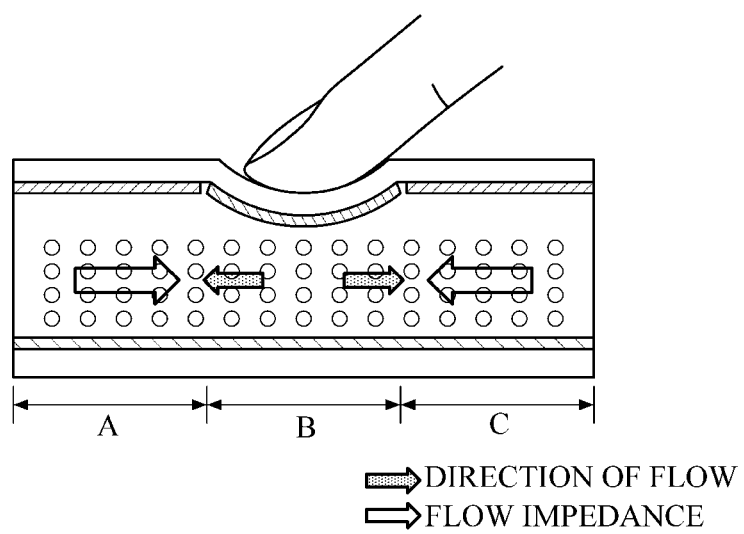

Besides this, the electro-rheological fluid 113 with high viscosity restricts the flow of its adjacent electro-rheological fluid 113. FIGS. 5A and 5B are views for comparatively explaining a phenomenon where flow impedance increases when the flow of electro-rheological fluid is restricted, wherein FIG. 5A shows an example where a driving voltage is applied to driving electrode pairs corresponding to a pressed area B to increase the viscosity of the area B, and no driving voltage is applied to its peripheral areas A and C, and FIG. 5B shows an example where a driving voltage is applied to driving electrode pairs corresponding to the pressed area B and its peripheral areas A and C to increase the viscosity of all the areas A, B and C. As shown in FIGS. 5A and 5B, the flow impedance which is a force against the direction of flow caused by a pressing force is greater in the case in FIG. 5B where the driving voltage is applied to the peripheral areas A and C than in the case in FIG. 5A where no driving voltage is applied to the peripheral areas A and C. Accordingly, a resistive force of the touch panel 100 can be increased by applying a driving voltage both to driving electrode pairs corresponding to an input button area and to driving electrode pairs corresponding to its peripheral areas. Also, a repulsive force and/or a resistive force of the touch panel 100 may depend on whether the viscosity increased area wholly belongs to the input button area, extends over the input button area and its peripheral area, or is spaced a distance from the input button area.

As such, when the flow of the electro-rheological fluid 113 is restricted, a resistive force or a repulsive force against a pressing force applied to the touch panel 100 increases accordingly. The repulsive force is proportional to a degree at which the flow of the electro-rheological fluid 113 is restricted, that is, to the number and/or locations of driving electrode pairs to which the driving voltage is applied. By utilizing the characteristics of the touch panel 100 to change the viscosity increased area, that is, the number and/or locations of driving electrode pairs to which the driving voltage is applied among the driving electrode pairs 114, a repulsive force (that is, an operating force) that will be felt by a user upon clicking of the touch panel 100 may be changed.

Figure 6A:
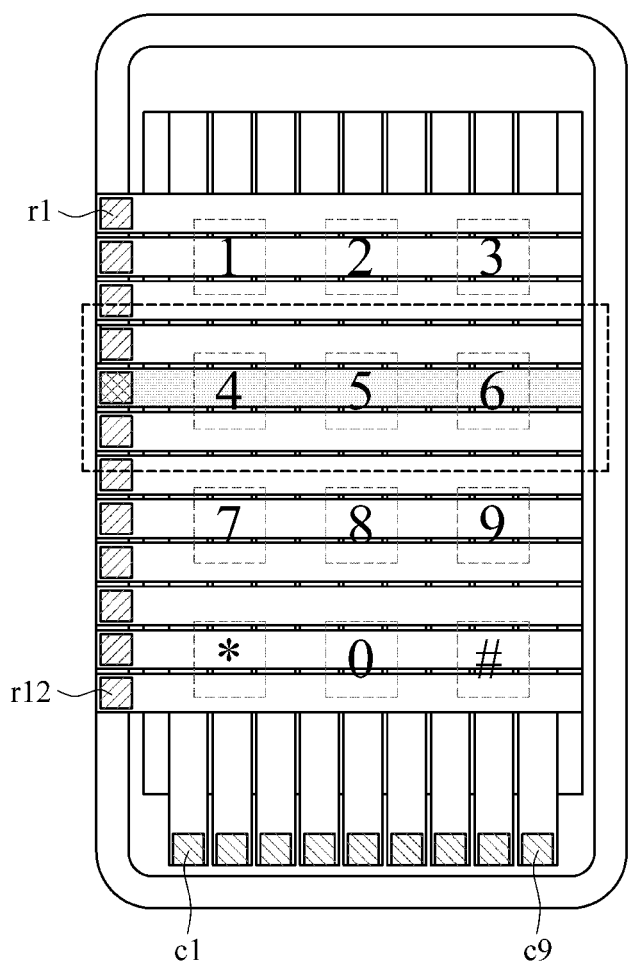
FIGS. 6A and 6B are views for explaining examples where a driving voltage is applied to different numbers of driving electrode pairs in a touch panel.
Figure 6B:
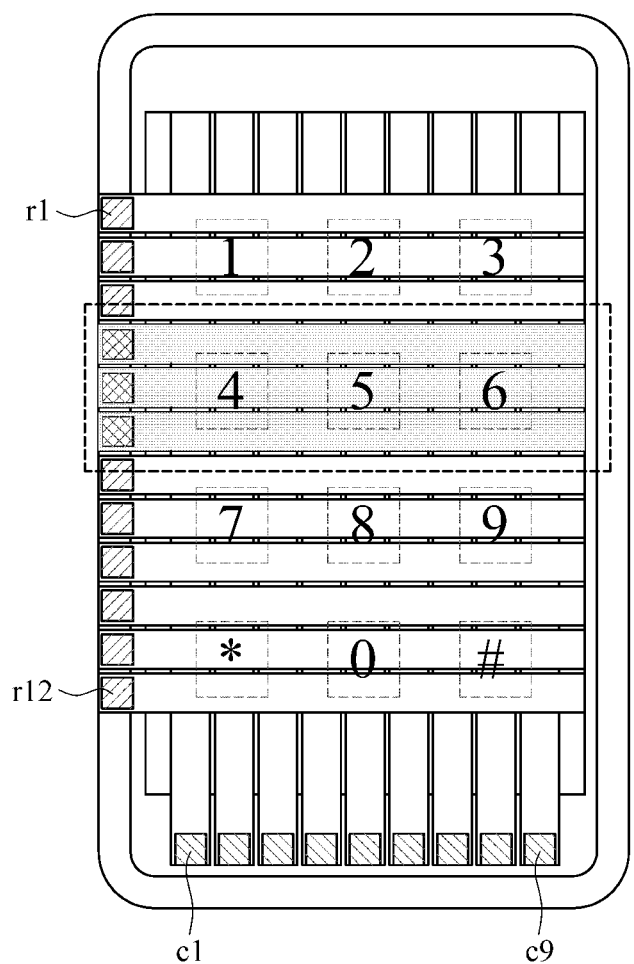
Figure 6B:
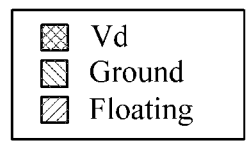
Figure 7:
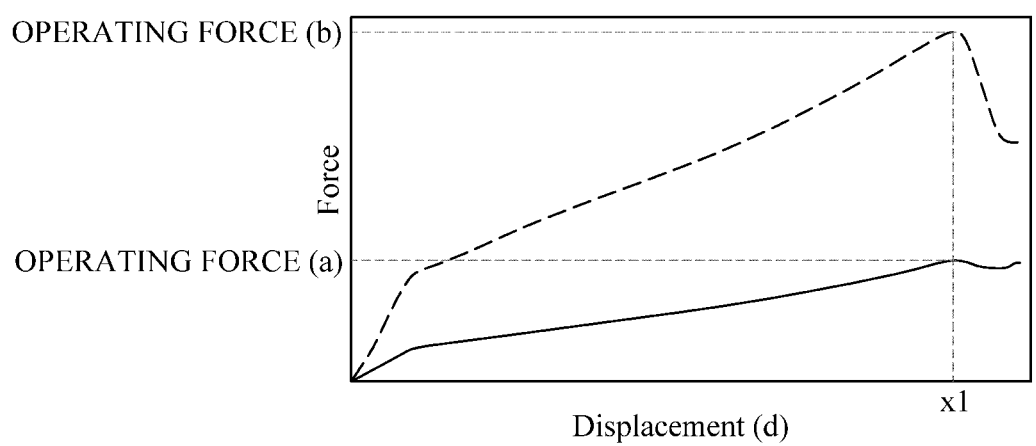
FIG. 7 is a graph showing changes of an operating force with respect to displacement in the examples illustrated in FIG. 6.

FIGS. 6A, 6B and 7 are views for explaining an increase in operating force as the number of driving electrode pairs to which a driving voltage is applied increases, wherein FIG. 6A and FIG. 6B show examples where a driving voltage is applied to different numbers of driving electrode pairs in a touch panel, and FIG. 7 is a graph showing changes of an operating force with respect to displacement in the examples illustrated in FIGS. 6A and 6B.

The touch panel illustrated in FIGS. 6A and 6B has 9 columns of lower electrode patterns c1 through c9 and 12 rows of upper electrode patterns r1 through r12. A numerical button is defined at an area below which three lower electrode patterns overlap three upper electrode patterns. As a result, the touch panel includes a total of 108 (9×12) driving electrode pairs and each numerical button is assigned 9 driving electrode pairs. The 9 driving electrode pairs defining a numerical button may be referred to as a driving electrode pair group. In the current example, the lower electrode patterns c1 through c9 of the touch panel are all grounded. Hereinafter, descriptions about only numerical buttons 4, 5 and 6 will be given excluding the other numerical buttons 1, 2, 3, 7, 8, 9, *, 0 and #. It should be noted that the 9×12 array of 108 driving electrode pairs is only exemplary, and the number of rows and/or columns of electrodes may be increased or decreased.

Referring to FIG. 6A, a driving voltage is applied only to the second row of upper electrode pattern r5 among rows of upper electrode patterns r4, r5 and r6 on which the numerical buttons 4, 5 and 6 are positioned, and the remaining rows of upper electrode patterns r4 and r6 are maintained in a floating state. That is, a driving voltage is applied only to three driving electrode pairs for each numerical button. Meanwhile, referring to FIG. 6B, a driving voltage is applied to all three rows of upper electrode patterns r4, r5 and r6 on which the numerical buttons 4, 5 and 6 are positioned, that is, a driving voltage is applied to all 9 driving electrode pairs of the driving electrode pair group for each of the numerical buttons 4, 5, 6. It can be seen from FIG. 7 that an operating force (a) of the touch panel illustrated in FIG. 6A is significantly different from an operating force (b) of the touch panel illustrated in FIG. 6B. Also, the more driving electrode pairs a driving voltage is applied to, the greater the operating force becomes. Accordingly, by utilizing the characteristics of the touch panel to adjust the number of driving electrode pairs to which a driving voltage is applied, various clicking sensations can be offered.

Figure 8A:
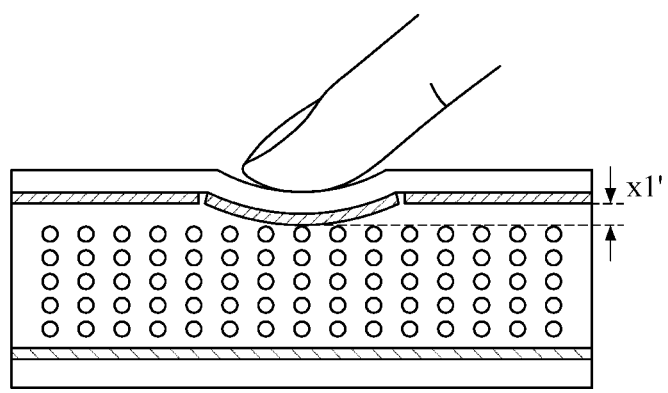
FIGS. 8A to 8C show examples where a driving voltage applied to the touch panel is removed at different displacements.
Figure 8B:
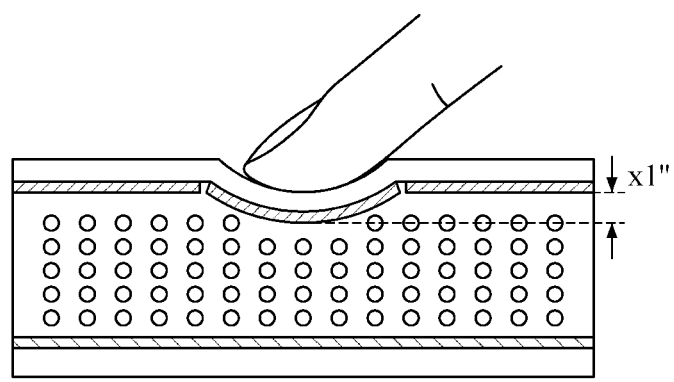
Figure 8C:
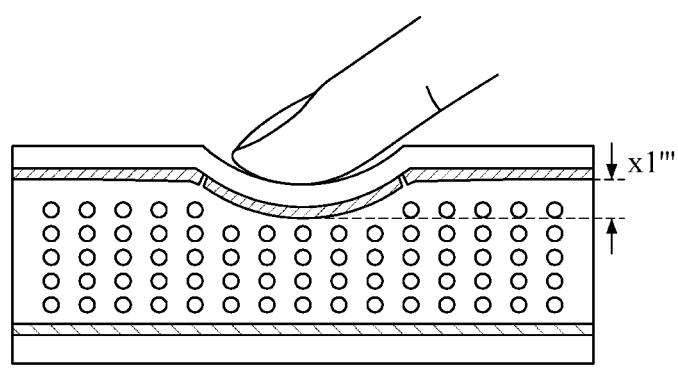
Figure 9:
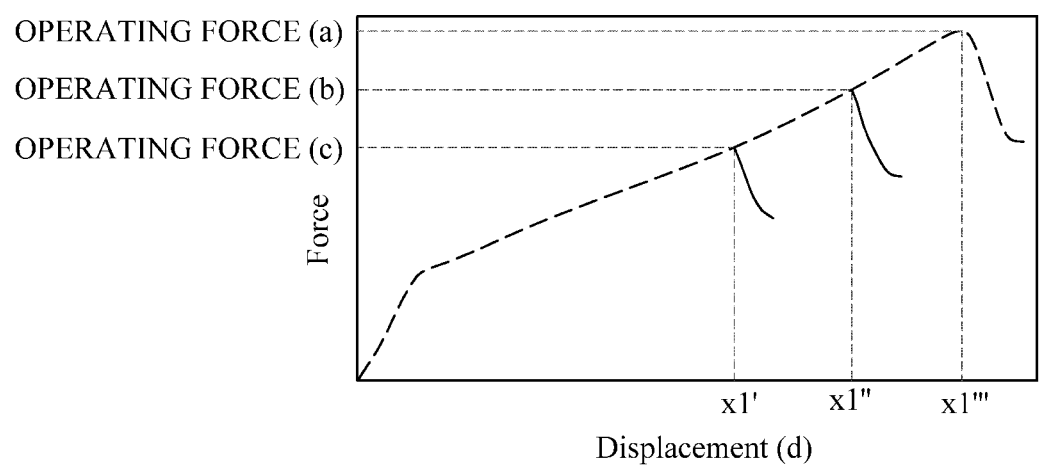
FIG. 9 is a graph showing changes of an operating force with respect to displacement in the examples illustrated in FIG. 8.

FIGS. 8A to 8C and 9 are views for explaining an increase in operating force depending on displacement at which a driving voltage is removed, wherein FIGS. 8A to 8C show examples where a driving voltage applied to a touch panel is removed at different displacements, and FIG. 9 is a graph showing changes of an operating force with respect to displacement in the examples illustrated in FIGS. 8A to 8C. FIG. 8A corresponds to the case where the driving voltage is removed at a smallest displacement x1', FIG. 8C corresponds to the case where the driving voltage is removed at a largest displacement x''', and FIG. 8B corresponds to the case where a displacement x'' at which the driving voltage is removed is between the smallest displacement x' and the largest displacement x'''. As shown in FIGS. 8A to 8C and 9, the maximum repulsive force against the touch panel increases in proportion to the displacement at which the driving voltage is removed. That is, operating force (a)>operating force (b)>operating force (c) as shown in FIG. 9. Therefore, by differentiating displacement at which a driving voltage is removed, various clicking sensations can be provided to a user.

Figure 10:
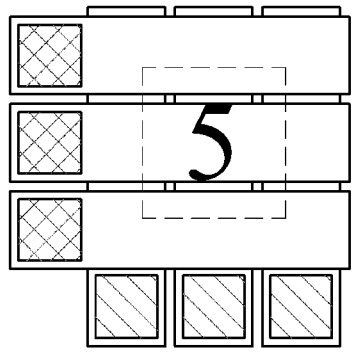
FIG. 10 shows an example where a driving voltage is applied to all driving electrode pairs belonging to a driving electrode pair group.
Figure 10:
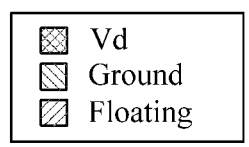
Figure 11A:
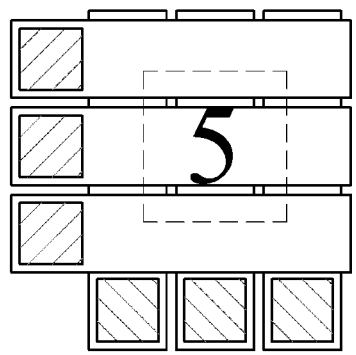
FIGS. 11A to 11D show examples where the driving voltage applied to the driving electrode pairs of FIG. 10 is removed at different areas.
Figure 11A:
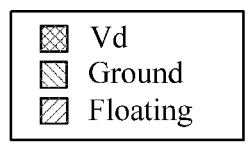
Figure 11B:
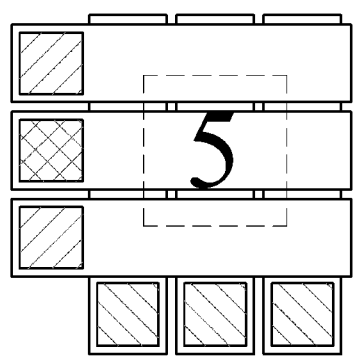
Figure 11B:
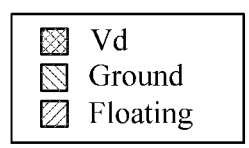
Figure 11C:
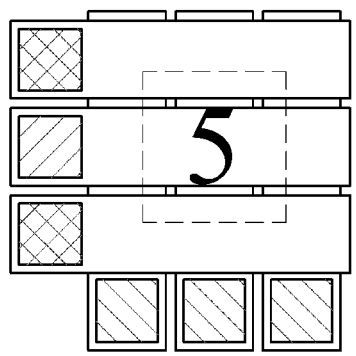
Figure 11C:
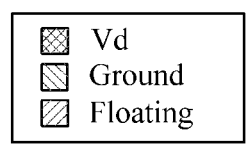
Figure 11D:
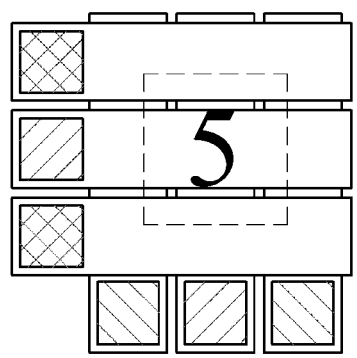
Figure 11D:
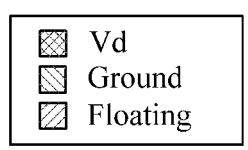
Figure 12:
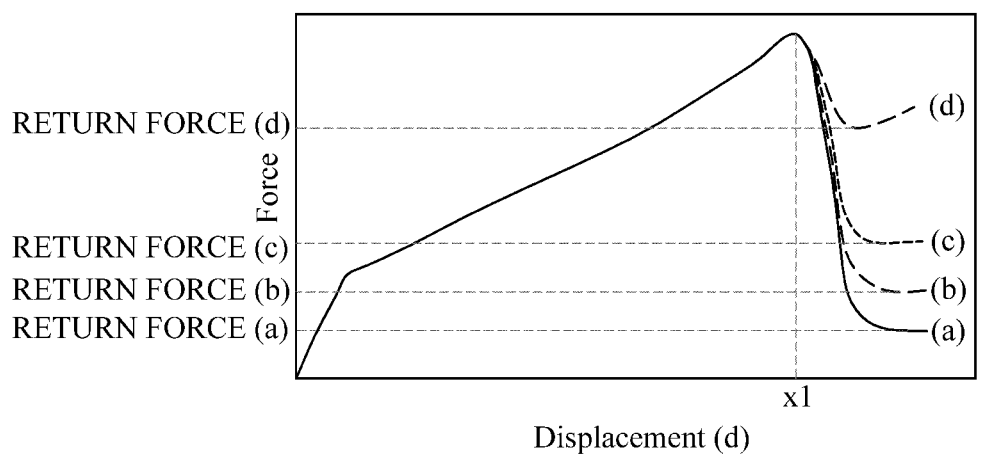
FIG. 12 is a graph showing changes of an operating force and a return force with respect to displacement in the examples illustrated in FIG. 11.

FIGS. 10, 11A to 11D and 12 are views for explaining a phenomenon where a return force is reduced, as the driving voltage is removed from a higher number of driving electrode pairs, among driving electrode pairs (that is, a driving electrode pair group defining a numerical button "5" which is an input button) to which the driving voltage has been applied. FIG. 10 is an enlarged view of the numerical button "5" of the touch panel illustrated in FIG. 6B where three columns of lower electrode patterns c4, c5 and c6 are grounded and a driving voltage is applied to three rows of upper electrode patterns r4, r5 and r6. The numerical button "5" is defined by 9 driving electrode pairs. FIGS. 11A to 11D show examples where different numbers of driving electrode pairs from which the applied driving voltage is removed in the touch panel illustrated in FIG. 10, wherein FIG. 11A corresponds to the case where the applied driving voltage is removed from all 9 driving electrode pairs, FIG. 11B corresponds to the case where the applied driving voltage is removed from two rows of driving electrode pairs r4 and r6, FIG. 11C corresponds to the case where the applied driving voltage is removed from one row of driving electrode pairs r5 and FIG. 11D corresponds to the case where the applied driving voltage is removed from one row of driving electrode pairs r5 while one column of lower electrode patterns c5 is maintained in a floating state. FIG. 12 is a graph showing changes of an operating force and a return force with respect to displacement in the examples illustrated in FIGS. 11A to 11D. That is, lines (a) to (d) correspond to the configurations shown in FIGS. 11A to 11D, respectively.

Referring to FIGS. 10 and 12, the driving voltage applied to the driving electrode pair group is maintained until displacement of the upper substrate of the touch panel reaches a buckling point x1, and as a result, a repulsive force against the touch panel increases with an increase in displacement. When the displacement of the upper substrate reaches the buckling point x1, the driving voltage applied to all or some of driving electrode pairs belonging to the driving electrode pair group is removed. As shown in FIGS. 11A to 11D and 12, the greater the number of driving electrode pairs from which the driving voltage is removed after the buckling point, the smaller the return force. Therefore, by adjusting the number of driving electrode pairs from which the driving voltage is removed, various clicking sensations may be offered.

The above-described operation of the touch panel may be implemented by the sensing unit 120 and/or the controller 130 of the touch panel 100 illustrated in FIG. 1. Hereinafter, the operation will be described in more detail with reference to FIGS. 1 and 2.

The sensing unit 120 detects an input from a user and calculates a location of the detected user input. Then, information about the input detection and the input location acquired by the sensing unit 120 may be transferred to the controller 130. A method in which the sensing unit 120 detects a user input is not limited. For example, when an input (contact or pressing) to a touch surface of the upper substrate 112 occurs, the upper substrate 112 is deformed at a location where the input has occurred, so that a displacement is made. In this case, the sensing unit 120 may detect the input by measuring a change in capacitance due to the deformation of the upper substrate 112, for example, due to a change of a gap thickness between the upper and lower substrates 111 and 112. By varying criteria for detecting the input, that is, by varying a threshold regarding a capacitance change between the upper and lower substrates 111 and 112 that will be used to determine the occurrence of an input, a degree of displacement at which the sensing unit 120 determines occurrence of the input may also change. Accordingly, the touch panel 100 may change the criteria by which the sensing unit 120 determines the occurrence of an input, thereby adjusting a degree of displacement at which the applied driving voltage is removed. By changing the criteria, various clicking sensations may also be provided (see FIGS. 8A to 8C and 9).

The controller 130 may control the number and/or locations of driving electrode pairs to which a driving voltage is applied. In more detail, the controller 130 may vary the number and/or locations of driving electrode pairs to which a driving voltage is applied, thus defining an input button (see FIGS. 6A, 6B and 7). For example, in order to provide a large operating force (repulsive force), the controller 120 may apply a driving voltage to driving electrode pairs corresponding to both an area on which an input button is defined and its peripheral area. It will be apparent to one of ordinary skill in the art that the peripheral area may or may not overlap the input button partly. Also, in order to provide a small degree of an operating force (repulsive force), the controller 130 may apply a driving voltage only to driving electrode pairs corresponding to an area on which an input button is defined while applying no driving voltage to a peripheral area of the input button. In this case, it will be apparent to one of ordinary skill in the art that a repulsive force can be changed in a stepwise manner by changing in a stepwise manner the number or locations (the distance from the input button area, etc.) of driving electrode pairs to which the driving voltage is applied among the driving electrode pairs corresponding to the peripheral area.

After the sensing unit 120 determines the occurrence of an input or after receiving an input signal from the sensing unit 120, the controller 130 may adjust the number and/or locations of driving electrode pairs from which the driving voltage is removed. In more detail, the controller 130 may change, after the buckling point, the number and/or locations of driving electrode pairs from which the driving voltage is removed (see FIGS. 10 and 12). For example, in order to provide a larger return force, the controller 130 may stop applying the driving voltage to some of driving electrode pairs to which the driving voltage has been applied and allow the driving electrode pairs to enter into a floating state. Also, in order to provide a smaller return force, the controller 130 may release the driving voltage from all or a majority of the driving electrode pairs to which the driving voltage has been applied. In this case, it will be apparent to one of ordinary skill in the art that by changing the number of driving electrode pairs from which the driving voltage is removed in a stepwise manner, a return force may be changed in a stepwise manner.

As such, the criteria by which the sensing unit 120 determines occurrence of an input, for example, a degree of displacement at which it is determined that an input has occurred or a degree of a repulsive force at the displacement, or the number or locations of driving electrode pairs from which the driving voltage is removed may be predetermined or changed according to the types of applications to be executed or the stages of the executed application. In the latter case, the determination criteria of the sensing unit 120 or the operation criteria of the controller 130 may be adjusted by a program installed in advance or changed according to input by a user. For example, the sensing unit 120 and/or the controller 130 may be set to provide a greater clicking sensation upon inputting important information such as a password or upon executing an important application such as a financial application or the like, or different degrees of clicking sensation may be set according to stages of an executed application. On the other hand, the sensing unit 120 and/or the controller 130 may be set to provide, when executing a simple form of entertainment such as a game, a small clicking sensation or provide a constant clicking sensation regardless of the stage of an executed application.

A number of embodiments have been described above. Nevertheless, it will be understood that these embodiments are exemplary and various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A touch panel comprising:
   a first substrate;
   a second substrate that is spaced apart from the first substrate by a gap, the second substrate comprising a touch surface;
   an array of driving electrode pairs that is arranged on the first substrate and the second substrate, and induces an electrical field locally between the first substrate and the second substrate when a driving voltage is applied thereto;
   electro-rheological fluid that is filled in the gap between the first substrate and the second substrate, a viscosity of the electro-rheological fluid changing depending on the electrical field induced by the driving electrode pairs;
   a plurality of spacers made of elastic material and disposed in the gap between the first substrate and the second substrate and configured to provide the second substrate with a restoring force and structural support; and
   a controller configured to adjust a return force by adjusting or removing the driving voltage applied to the driving electrode pairs when a displacement of the second substrate reaches a threshold level due to a pressing e applied to the touch surface of the second substrate.

2. The touch panel of claim 1, wherein at least one of a number of the driving electrode pairs among the array of the driving electrode pairs, and a location of the driving electrode pairs among the array of the driving electrode pairs, is adjustable.

3. The touch panel of claim 2, wherein the controller is configured to adjust at least one of a number of driving electrode pairs from which the driving voltage is removed among the driving electrode pairs to which the driving voltage has been applied, and a location of driving electrode pairs from which the driving voltage is removed among the driving electrode pairs to which the driving voltage has been applied.

4. The touch panel of claim 2,
wherein the controller is configured to determine whether an input occurs by measuring a change in a thickness of the gap between the first and second substrates due to the pressing force against the touch surface and compares the measured thickness to a threshold thickness, and the threshold thickness is adjustable.

5. The touch panel of claim 4, wherein the controller is configured to adjust at least one of a number of driving electrode pairs from which the driving voltage is removed among the driving electrode pairs to which the driving voltage has been applied, and a location of driving electrode pairs from which the driving voltage is removed among the driving electrode pairs to which the driving voltage has been applied.

6. The touch panel of claim 1, wherein the controller is configured to adjust an operating force.

7. A touch panel comprising:
a touch panel body comprising a first substrate and a second substrate, electro-rheological fluid that fills in a gap between the first substrate and the second substrate, and an array of driving electrode pairs that is arranged on the first substrate and the second substrate to induce an electrical field locally in the gap between the first substrate and the second substrate when a driving voltage is applied;
a controller configured to adjust at least one of a number of driving electrode pairs to which the driving voltage is applied among the array of the driving electrode pairs, and a location of driving electrode pairs to which the driving voltage is applied among the array of the driving electrode pairs, in order to vary an operating force of the touch panel body;
a plurality of spacers made of elastic material and disposed in the gap between the first substrate and the second substrate and configured to provide the second substrate with a restoring force and structural support,
wherein the controller s further configured to adjust a return force by adjusting or removing the driving voltage applied to the driving electrode pairs when a displacement of the second substrate reaches a threshold level due to a pressing force applied to a surface of the second substrate.

8. The touch panel of claim 7, wherein the array of the driving electrode pairs includes one or more driving electrode pair groups each comprising a plurality of driving electrode pairs which defines an input button area, and
the controller is configured to adjust a number of driving electrode pairs to which the driving voltage is applied among the driving electrode pairs belonging to each driving electrode pair group, or a location of driving electrode pairs to which the driving voltage is applied among the driving electrode pairs belonging to each driving electrode pair group, or both.

9. The touch panel of claim 7, further comprising a sensing unit configured to determine whether an input to a touch surface of the first substrate occurs by measuring a change in a gap thickness between the first substrate and the second substrate.

10. The touch panel of claim 9, wherein the sensing unit is configured to determine whether the input occurs by comparing the measured change in gap thickness against a threshold gap thickness, and the threshold gap thickness is adjustable.

11. The touch panel of claim 7, wherein the controller is configured to adjust at least one of a number of driving electrode pairs from which the driving voltage is removed, among the driving electrode pairs to which the driving voltage has been applied, and a location of driving electrode pairs from which the driving voltage is removed, among the driving electrode pairs to which the driving voltage has been applied, in order to vary the return force of the touch panel body.

12. The touch panel of claim 11, further comprising a sensing unit configured to determine whether an input to a touch surface of the first substrate occurs by measuring a change in the gap thickness between the first substrate and the second substrate,
wherein the sensing unit is further configured to determine whether the input occurs by comparing the measured change in gap thickness to a threshold gap thickness, and the threshold gap thickness is adjustable.

13. A touch panel comprising:
a touch panel body comprising a first substrate and a second substrate, electro-rheological fluid that fills a gap between the first substrate and the second substrate, and an array of driving electrode pairs that is arranged on the first substrate and the second substrate to induce an electrical field locally in the gap between the first substrate and the second substrate when a driving voltage is applied;
a sensing unit configured to determine whether an input to a touch surface of the first substrate occurs by measuring a change in a gap thickness between the first substrate and the second substrate;
a plurality of spacers made of elastic material and disposed in the gap between the first substrate and the second substrate and configured to provide the second substrate with a restoring force and structural support; and
a controller configured to adjust a return force by adjusting or removing the driving voltage applied to the driving electrode pairs when a displacement of the second substrate reaches a threshold level due to a pressing force applied to the touch surface of the second substrate,
wherein the change in the gap thickness that is used to determine when an input has occurred, is adjustable.

14. A touch panel of claim 13, wherein the controller comprises a first controller configured to adjust at least one of a number of driving electrode pairs to which the driving voltage is applied among the array of the driving electrode pairs, and a location of driving electrode pairs to which the driving voltage is applied among the array of the driving electrode pairs, in order to vary an operating force of the touch panel body.

15. The touch panel of claim 14, wherein the array of the driving electrode pairs includes one or more driving electrode pair groups each comprising a plurality of driving electrode pairs and defining an input button area, and
the first controller is configured to adjust at least one of driving electrode pairs to which the driving voltage is applied, among the driving electrode pairs belonging to each driving electrode pair group.

16. The touch panel of claim 14, wherein the controller further comprises a second controller configured to adjust at least one of a number of driving electrode pairs from which the driving voltage is removed, among the driving electrode pairs to which the driving voltage has been applied, and a location of driving electrode pairs from which the driving voltage is removed, among the driving electrode pairs to which the driving voltage has been applied, in order to vary the return force of the touch panel body.

17. An electronic device including the touch panel of claim 1 as an input device.

18. An electronic device including the touch panel of claim 7 as an input device.

19. An electronic device including the touch panel of claim 13 as an input device.

20. The touch panel according to claim 1, wherein the electric field is induced locally between individual ones of the driving electrode pairs when the driving voltage is applied individually to the driving electrode pairs.

21. A touch panel comprising:
a first substrate;
a second substrate that is spaced apart from the first substrate by a gap, the second substrate comprising a touch surface;
an array of driving electrode pairs that is arranged on the first substrate and the second substrate, and induces an electrical field locally between the first substrate and the second substrate when a driving voltage is applied thereto;
electro-rheological fluid that is filled in the gap between the first substrate and the second substrate, a viscosity of the electro-rheological fluid changing depending on the electrical field induced by the driving electrode pairs; and
a controller configured to define an input button area on the touch surface by adjusting at least one of a number of driving electrode pairs to which the driving voltage is applied among the array of the driving electrode pairs, and a location of driving electrode pairs to which the driving voltage is applied among the array of the driving electrode pairs, and to adjust or remove the applied driving voltage when a displacement of the second substrate of the touch panel reaches a predetermined threshold level due to a pressing force applied to the touch surface of the second substrate based on at least one of a type of an application and a state of the application.

22. A touch panel comprising:
a first substrate;
a second substrate that is spaced apart from the first substrate by a gap, the second substrate comprising a touch surface;
an array of driving electrode pairs that is arranged on the first substrate and the second substrate, and induces an electrical field locally between the first substrate and the second substrate when a driving voltage is applied thereto;
electro-rheological fluid that is filled in the gap between the first substrate and the second substrate, a viscosity of the electro-rheological fluid changing depending on the electrical field induced by the driving electrode pairs; and
a controller configured to adjust an operating force by adjusting a size of a touch panel area for a specific input button to which the driving voltage is applied or by varying an amount of displacement of the second substrate at which the applied driving voltage is removed, and to adjust the return force by adjusting a size of the touch panel area from which the applied driving voltage is removed while the applied driving voltage is maintained in the touch panel area for the specific input button.

* * * * *